United States Patent [19]

Boudewijns

[11] Patent Number: 4,571,625

[45] Date of Patent: Feb. 18, 1986

[54] TELEVISION CAMERA WITH A SOLID-STATE PICK-UP DEVICE

[75] Inventor: Arnoldus J. J. Boudewijns, Eindhoven, Netherlands

[73] Assignee: U.S. Philips Corporation, New York, N.Y.

[21] Appl. No.: 571,623

[22] Filed: Jan. 17, 1984

[30] Foreign Application Priority Data

Jan. 18, 1983 [NL] Netherlands ............... 8300176

[51] Int. Cl.$^4$ ............................................. H04N 3/14
[52] U.S. Cl. ..................................................... 358/213
[58] Field of Search ................ 358/213, 41, 209, 44, 358/212

[56] References Cited

U.S. PATENT DOCUMENTS

4,213,145 7/1980 Nagumo ............................. 358/41
4,460,919 7/1984 Takemura ........................... 358/44

Primary Examiner—Gene Z. Rubinson
Assistant Examiner—Stephen Brinich
Attorney, Agent, or Firm—Thomas A. Briody; William J. Streeter; Marianne Rich

[57] ABSTRACT

A television camera has a solid-state pick-up device having pick-up elements arranged in rows and columns, wherein a charge transfer can be effected in the columns by means of control electrodes and an associated control circuit. To have the pick-up device generate a single or multiple interlace picture signal without specific measures being required due to the structure of the pick-up elements, the control circuit supplies during at least one field scanning period out of a number of field periods forming a picture period, a charge transfer signal for effecting a single charge transfer between all the consecutive pick-up elements in each column of pick-up elements.

8 Claims, 14 Drawing Figures

TELEVISION CAMERA WITH A SOLID-STATE PICK-UP DEVICE

BACKGROUND OF THE INVENTION

1. Field of the Invention

The invention relates to a television camera comprisingg a solid-state pick-up device having pick-up elements arranged in rows and columns and control electrodes coupled thereto for obtaining a charge transfer between pick-up elements, and also a control circuit, coupled to the control electrodes the pick-up device producing an interlaced television picture signal by means of this control circuit and these control electrodes, with field periods forming a frame period, each field period comprising a field scanning and blanking period.

2. Description of the Prior Art

Such a television camera is described in an article in the periodical "IEEE Transactions on Electron Devices", Vol. ED-20, No. 6, June 1973, pages 535 to 541, inclusive. The article discusses the problem of how to cause a television camera comprising a solid-state pick-up device to produce a single, 2:1 interlaced picture signal. A solution described therein is to compose different combinations of pairs of the rows of opto-electronic pick-up elements in two field periods, which together form a frame period. Thus, the items of information obtained from the sequentially numbered rows 1,2,3,4,5,6 etc. of pick-up elements can be combined in the first field period to form information associated with odd television lines 1,3,5 etc. in accordance with the formula: rows 1+2, 3+4, 5+6 etc., and in the second field period combinations of information can be formed associated with even television lines 2,4,6 etc. in accordance with the formula: rows 2+3, 4+5, 6+7. In addition it is disclosed that when the solid-state pick-up device is a biphase-controlled charge transfer device, the pick-up devices each having two control electrodes, it is possible to apply to these control electrodes a voltage of such a value that a light integration and charge storage corresponding to optical information is effected in the first field period for one control electrode and for the other control electrode in the second field period. In these two described cases the center point of the light integration areas with the charge storage at the solid-state pick-up device are moved to a central position, which corresponds to an interlace on recording and display of the picture signal.

It is further described that when the solid state pick-up device is in the form of a three-phase-controlled charge transfer device, the storage elements each comprising three control electrodes, a shift of the center points of the light integration areas with the charge storage can be realized by biasing in the first field period one of the three control electrodes for the charge storage and biasing the other two control electrodes in the second field period. In this situation, the light integration areas with the storage of information active in the first field period are not the same shape as those active in the second field period, which may be considered as a drawback, as the shifted light integration area is then indeed of the same size, but the area for charge storage is approximately doubled. On display of the picture signal, this might result in luminance variations between the picture signal of the first and second field periods, which may result in annoying flicker phenomena occurring at the picture frequency.

SUMMARY OF THE INVENTION

The invention has for its object to provide a television camera comprising a solid state pick-up device which directly generates an interlaced picture signal, shape and position of light integration areas and of the charge-storage areas and the control electrode structure for one or multi-phase control having no influence on the interlace. According to the invention, a television camera is characterized in that during at least one field scanning period of each frame the control circuit produces a charge transfer signal for effecting a single charge transfer between all the consecutive pick-up elements in each column of pick-up elements.

By means of the single charge transfer between the pick-up elements in the columns of the solid-state pick-up device during one or more field scanning periods, it is possible, based on the same principle, for one single or multiple interlaced picture signal to be directly produced by the solid-state pick-up device.

An embodiment of a television camera according to the invention is therefore characterized in that when an interlace is used in which a picture period comprises an integral number of n field periods and in the event in which the charge transfer signals for the single charge transfer occur $(n-1)$ times in the picture period, these signals occur alternately in field period portion deviating from zero and approximately equal to the $(n-1)/n$, $(n-2)/n$ etc. part of the field period.

Another embodiment is characterized in that when an interlace is used in which a picture period comprises an integral number of m field periods and in the event in which the charge transfer signals for the single charge transfer occur m times in the picture period, these signals occur alternately at instants of the field period which, if considered in succession, differ from each other by approximately $(1/m)$-part of the field period.

The single charge transfer between the pick-up elements in the columns of the solid-state pick-up device can be employed for correcting to some extent position-dependent sensitivity differences at the solid state pick-up device relative to a, for example, opto-electronic conversion at the pick-up elements.

A television camera construction is then characterized in that the control circuit produces the said charge transfer signal for the single charge transfer for a sequentially effected transfer between the pick-up elements.

A still wider correction with a position-dependent adaption is realized in a camera structure which is further characterized in that the sequential charge transfer is effected at a variable rate.

BRIEF DESCRIPTION OF THE DRAWING

The invention will now be further described by way of example with reference to the accompanying drawings, in which FIGS. 1a-1d show a circuit diagram of relevant components of an embodiment of a television camera according to the invention operating with a single, 2:1 interlace, and some signal diagrams associated therewith, FIG. 2 illustrates the operation of the television camera shown in FIG. 1, FIG. 3a shows a signal diagram possible for the camera shown in FIG. 1, FIG. 3b illustrating its operation, FIG. 4a and FIG. 4b likewise hold for an embodiment of a camera operating with a multiple, 3:1 interlace.

DESCRIPTION OF THE PREFERRED EMBODIMENTS

In FIG. 1, PP denotes a solid-state pick-up device which forms part of a black-and-white or colour television camera and comprises pick-up elements P arranged in rows P1 ... Px and columns P1 ... Py. The pick-up element column P1 comprises a series arrangement of pick-up elements P11, P12 etc. to P1x, the column Py being drawn with a series arrangement of pick-up elements Py1, Py2 etc. to Pyx. The pick-up elements P are located, for example (i.a. electrically) isolated from each other in the rows P1 ... Px, the pick-up elements P of the rows P1 and Px, respectively being sequentially denoted by P11, P21 etc. to Py1, and P1x, P2x etc. to Pyx, respectively. When light is projected as radiation onto the pick-up device PP, the pick-up elements P operate in the opto-electronic mode. Hereinafter, light will be used as an example of radiation, but other types of radiation, such as, for example, infrared or X-ray radiation might alternatively be picked-up by the pick-up device PP.

A pick-up device PP of the described structure may be provided in a what is commonly referred to as a frame transfer device of which also a field memory device PM and a parallel-in, series-out shift register SR form part. The field memory device PM and the shift register SR are provided with an opaque layer, contrary to the opto-electronic pick-up device PP. The field memory device PM is built-up with columns M1, M2 etc to My of series arrangements of shift elements, not shown. The shift register SR comprises register elements denoted by SR1, SR2 etc. to SRy, which are connected in parallel to the respective columns M1, M2 etc. to My and connected serially to an output terminal at which a signal PPS is indicated. The signal PPS is supplied by a frame transfer device (PP, PM, SR) thus formed, under the control of a control circuit CC which, for the sake of simplicity, is shown with three sub-control circuits CC1, CC2 and CC3, which are coupled to the pick-up device PP, to the memory device PM and to the shift register SR, respectively. The control circuit CC is active under the control of a synchronizing signal CS, which is further shown at input terminals of the circuits CC1, CC2 and CC3. Control signals PS, MS and SRS of which signals diagrams PS, MS and SRS are plotted schematically as a function of the time FIG. 1 are shown at outputs of the circuits CC1, CC2 and CC3, respectively. The two outputs of the control circuits CC1, CC2 and CC3 carry control signals in anti-phase. The signal diagrams MS and SRS shown, are associated with a control of the memory device PM and the shift register SR, as described in U.S. Pat. No. 3,824,337. Likewise, the signal diagram PS shown in FIG. 1 is associated with the known frame transfer control if a signal CTS 1 shown therein, is absent. According to the invention, the signal CTS 1 is present in the control signal PS for the pick-up device PP.

FIG. 1 shows the frame transfer device (PP,PM, SR) as an example of the use of the invention. Further embodiments using a row-by-row shift in a pick-up device (PP) for supplying a picture signal (PPS) are possible. There must however be a feature enabling a single charge transfer between all the consecutive pick-up elements (P) in each column (P1 ... Py) of pick-up elements (P). This provides a shift feature per row and per column, in any case for a shift over one pick-up element in the column directions.

Figures 1A, 2, 3A, 3B:
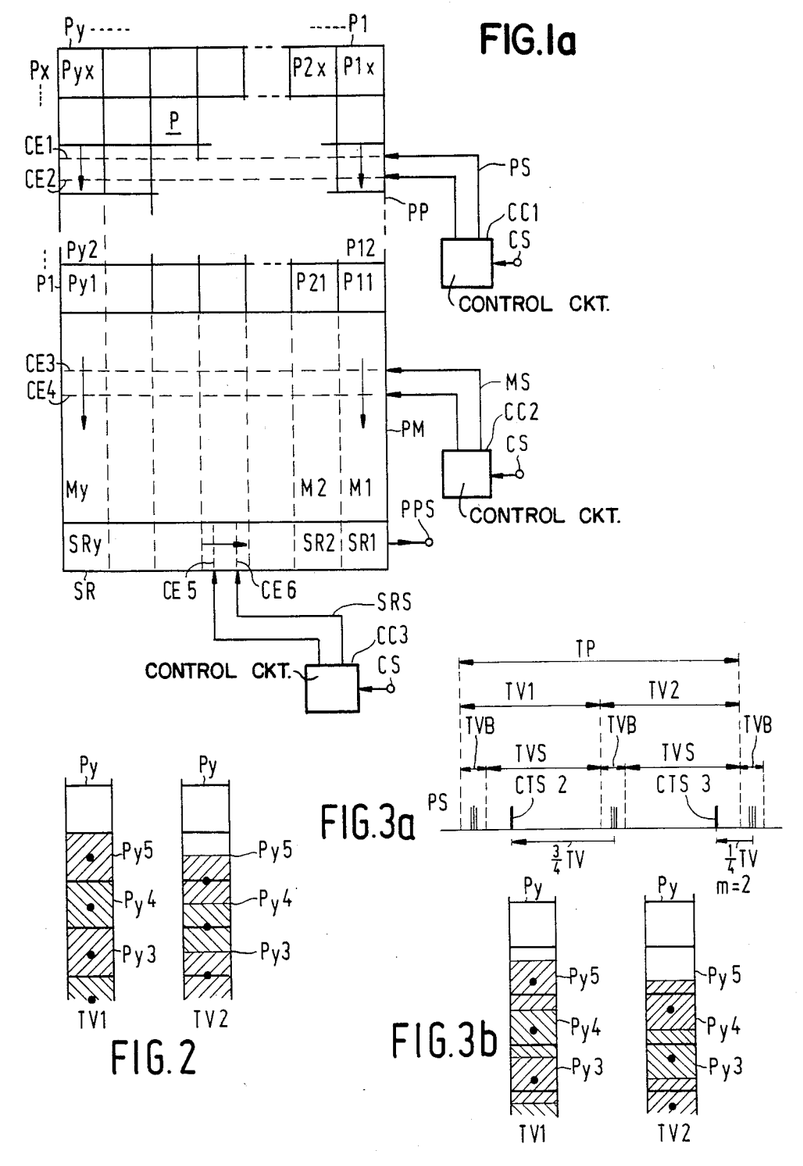

To explain the operation of the pick-up device PP according to the invention, a short description will first be given of the operation of the known frame transfer device (PP, PM, SR). The starting point is the example in which the devices PP and PM and the shift register SR are controlled in a biphase mode. For that purpose the circuits CC1, CC2 and CC3, each have two outputs, which are connected to control electrodes CE1 and CE2 of the pick-up device PP, to control electrodes CE3 and CE4 of the field memory device PM and to control electrodes CE5 and CE6 of the shift register SR, respectively. The pick-up elements P, the shift elements, not shown, of the device PM and the register elements of the shift register SR, being charge transfer arrangements, can, for example, be in the form of charge-coupled devices, bucket-memory devices, charge-injection devices or the like.

TP in the signal diagram PS of FIG. 1 denotes a television frame period. Assuming the use of a 2:1 interlace, the picture period TP comprises two field periods TV denoted by TV1 and TV2. TVS denoted a field scanning period and TVB denotes a field blanking period of the field periods TV1 and TV2. The periods of time TVS and TVB are shown not to scale for standardized television systems; the field blanking period TVB may, for example, be approximately 8% of the field period TV. In the absence of the signal CTS 1 the control signal PS pulses, which are shown schematically, occur in known manner only in the field blanking periods TVB. The period of time in which the pulses occur may, for example, be approximately 3% of the field period TV. The pulses in the periods of time TVB provide a shift of the information present in the pick-up elements P through the columns P1 ... Py to as far as the columns M1 ... My of the device PM, for which purpose the signal diagram MS of FIG. 1 also show pulses in the field blanking periods TVB.

Figure 1B:
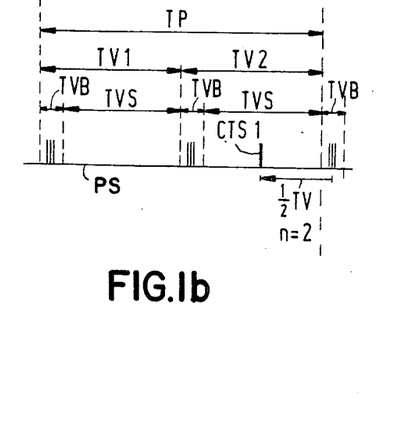
Figure 1C:
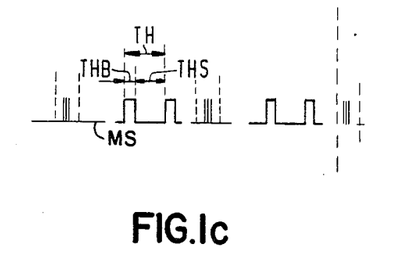
Figure 1D:
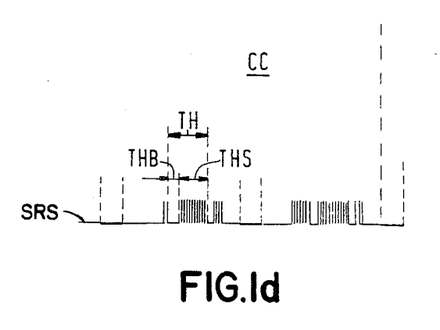

TH at the signal diagram MS denotes a television line period, which, also not shown to scale, comprises a line scanning period THS and a line blanking period THB. The pulse in the line blanking period THB, which pulse is shown in the signal diagram MS of FIG. 1, causes a single shift of information through the columns M1,M2 ... My to as far as the shift register stages SR1, SR2 .. . SRy. In the subsequent line scanning period THS the signal diagram SRS of FIG. 1 shows schematically pulses which provide a shift of information in the shift register SR to the terminal carrying the picture signal PPS.

In order to allow the known field transfer device (PP, PM, SR) to produce a single, 2:1 interlaced picture signal PPS, independent of the structure of the pick-up elements P and the mode of control for the charge transfer in the colums P1 ... Py, it is, for example, sufficient to introduce the signal CTS 1 which is shown schematically in the signal diagram PS. The signal CTS 1 of FIG. 1 is a charge transfer signal for simultaneously or sequentially effecting a single charge transfer between all the consecutive pick-up elements P in each column P1 . . . Py, more specifically during one of the two field scanning periods TVS of the picture period TP and approximately halfway therethrough. In the signal diagram PS of FIG. 1 it is shown that the charge transfer signal CTS 1 for the single charge transfer occurs approximately half a field period ($\frac{1}{2}$ TV) earlier than the period of time in which the subsequent shift at the devices PP and PM in the field blanking period TVB is effected. The charge transfer signal CTS 1 and further charge transfer signals CTS 2 to 11, still further to be described, for the single charge transfer occurs, for example, in a line blanking period THB in the field scanning period TVS, if cross-talk may occur to the shift register SR which produces the picture signal PPS.

For an explanation of the result of the signal CTS 1 for the single charge transfer reference is made to FIG. 2. In FIG. 2, part of a column of pick-up elements P of the pick-up device PP is shown twice, and the column Py is taken as a general example. Some pick-up elements P of the column Py are shown in greater detail as Py3, Py4 and Py5. In FIG. 2, TV1 and TV2 indicate that the column Py is considered at the end of the field period TV1 or TV2, as the case may be. From the signal diagram PS shown in FIG. 1 it follows that the pick-up device PP is active in known manner in the field period TV1. Thus, the shift of information in the field blanking period TVB of the field period TV1 is followed by a light information-integration period, light incident upon the pick-up device PP being coverted opto-electronically into electric charge stored in the pick-up elements P. Disregarding the period of time (approximately 3%) containing the shift pulses in the field blanking period TVB, this information integration period is assumed to be equal to the field period TV. In FIG. 2, at the column Py which contains the integrated information at the end of the field period TV1, hatched areas illustrate some (own) light integration areas associated with the pick-up elements P. The pick-up elements Py3 and Py5 are shown as having a clock-wise hatched light integration area and the pick-up element Py4 is shown as having a counter-clockwise hatched light integration area. Dots in FIG. 2 at the column Py (TV1) illustrate the center point of the light integration areas, which center points conicide with the centers of gravity of the areas of the pick-up elements Py3, Py4 and Py5. This results, at the end of the field period TV1, in information coming from its own light integration area being stored in the pick-up elements P of the pick-up device PP, which information will ultimately arive in the picture signal PPS and on display thereof will be present in the same position in the displayed picture.

The signal CTS 1 for the single charge transfer between the picture elements P in the columns P1 . . . Py, approximately halfway through the field period TV2, provides at the end thereof a distribution of information over the columns as shown at the column Py (TV2) of FIG. 2. It can be seen that at the end of the field period TV2 information, approximately one half of which originates from the own light integration area (period of time $\frac{1}{2}$ TV in the signal diagram PS of FIG. 1) and the other half from the light integration area shown at a higher position in the column Py (TV2), is stored in each pick-up element P of the column Py (TV2). Thus, it follows, for the pick-up element Py4 of the column Py (TV2) that stored therein are its own counter-clockwise hatched information and clockwise hatched information received from the pick-up element Py5. This causes the center point of the hatched information which correspond to the light integration areas to be shifted in the column Py (TV2) to as far as the central position compared to those of the column Py (TV2). The ultimate result will be a picture signal PPS having a likewise shifted information content, which picture signal PPS will on display display the information in the proper position in the event of an interlaced scanning. It will be obvious that the single charge transfer can be effected with equal results in the column direction opposite to the column direction described; this also holds for the further examples.

To obtain an interlaced picture signal PPS, it is alternatively possible to use the signal (diagram) PS shown in FIG. 3a, instead of the signal (diagram) PS of FIG. 1. FIG. 3b serves as an illustration of the operation of the pick-up device PP shown in FIG. 1. In the signal diagram PS of FIG. 3a a charge transfer signal, denoed by CTS 2 and CTS 3, for the single charge transfer occurs in the signal diagram PS of FIG. 3a in the field scanning period TVS of the two field periods TV1 and TV2. It can be seen, that compared to the original situation in which the light integration areas and pick-up element areas coincide (column Py (TV1) of FIG. 2), a shift of information is now also present in the column Py (TV1) of FIG. 3b at the end of the field period TV1. From the signal CTS 2 of FIG. 3a it can be seen that the integration occurs within the actual light integration area in approximately a period of time of $\frac{3}{4}$ TV. Previously, an information item integrated over a period of time $\frac{1}{4}$ TV was supplied from the superjacent pick-up element P of the column Py (TV1). Thus, it holds for the pick-up element Py4 of the column Py (TV1) of FIG. 3b that $\frac{3}{4}$-part of the own, counter-clockwise hatched light-integration information is combined with $\frac{1}{4}$-part of the clockwise hatched information associated with the pick-up element Py5. The center points of the hatched light-integration areas in accordance with column Py (TV1) of FIG. 3b are shifted downwards through $\frac{1}{4}$-part of the pick-up element height, compared to the column Py (TV1) of FIG. 2.

According to the signal CTS 3 in the signal diagram PS of FIG. 3a, a transfer of information precedes the own integration period equal to approximately $\frac{1}{4}$ TV. Thus, it now holds for the pick-up element Py4 in the column Py (TV2) that $\frac{1}{4}$-part of the own counter-clockwise hatched light-integration information is combined with $\frac{3}{4}$-part of the clockwise hatched information associated with the pick-up element Py5. The center points of the hatched light integration areas in accordance with column Py (TV2) of FIG. 3b are shifted upwards through $\frac{1}{4}$-part of the pick-up element height compared to the column Py (TV1) of FIG. 2. Comparing the columns Py (TV1) and Py (TV2) of FIG. 3b shows that the center points of the hatched areas are shifted through accurately half a pick-up element height, as is proper for an adequately effected 2:1 interlace on recording and display.

The signal diagrams PS shown in FIG. 1 and FIG. 3a are associated with a television camera producing a single, 2:1 interlaced picture signal PPS. In this situation the signal diagram PS of FIG. 1 requires the charge transfer signal CTS 1 once per picture period TP, while two charge transfer signal CTS 2 and CTS 3 are required in accordance with FIG. 3a. To stress this difference, the 2:1 interlace at the signal diagram PS is denoted in FIG. 1 by n=2 and by m=2 in the signal diagram of FIG. 3a.

The single charge transfer in accordance with the n-method of FIG. 1 and FIG. 2 has the advantage that it is simple, but, depending on the picture content, a flicker phenomenon having the picture frequency may occur, as during the field period TV1 (FIG. 2) the pick-up elements store P information associated with their own light integration area and during the field period TV2 there is stored in the pick-up elements P half the information from their own light integration area and half the information from the superjacent or subjacent light integration areas, respectively, so that during the field period TV2 there is a pick-up element height which is twice as large as during the field period TV1. This asymmetry may result in flicker. The single charge transfer in accordance with the m-method shown in FIG. 3a and FIG. 3b, avoids this asymmetry, as in both field periods TV1 and TV2 an information combination of ¼ and ¾-part of, alternately, their own and transferred information is formed over twice the original pick-up element height.

Figure 4A:
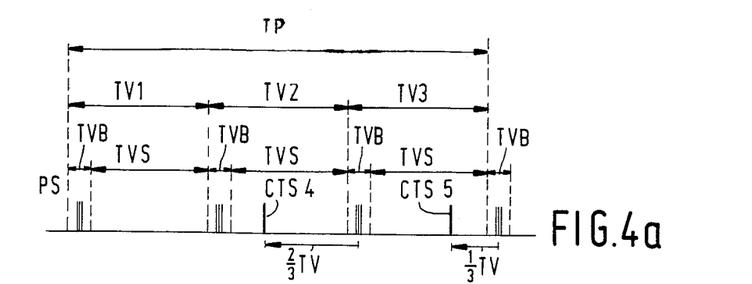
Figure 4B:
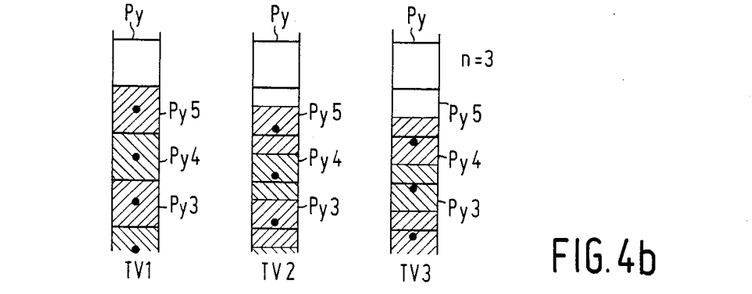
Figure 5A:
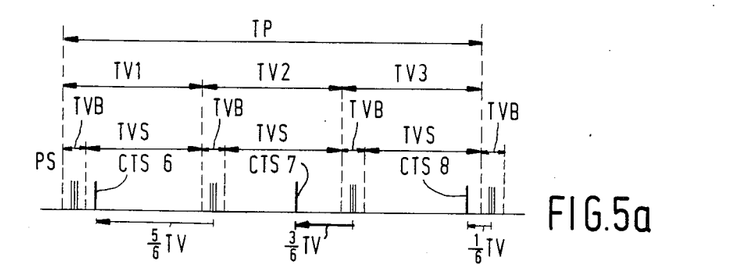
FIG. 5a and FIG. 5b are associated with an other embodiment of a camera operating with a 3:1 interlace, FIG. 6a and FIG. 6b relate to an embodiment of a camera operating with a 2:1 interlace and having three-phase-controlled control electrodes.
Figure 5B:
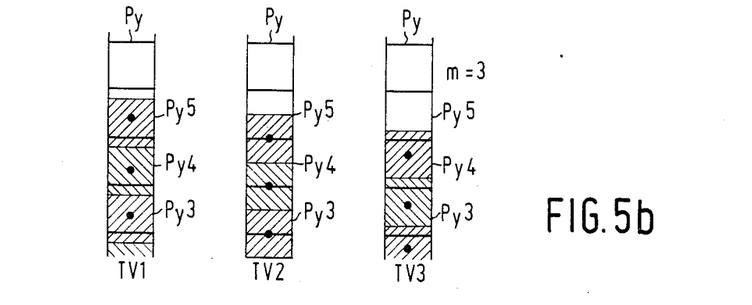

For the case in which the television camera shown in FIG. 1 must produce a multiple, for example a 3:1 interlaced, picture signal PPS, FIG. 4a shows a suitable signal diagram PS for n=3 and FIG. 5a for m=3. FIG. 4b and FIG. 5b have for their object to illustrate the operation of the pick-up device PP shown in FIG. 1. Three field periods TV1, TV2 and TV3 form as is shown in FIG. 4a and FIG. 5a, the picture period TP. As shown in the signal diagram PS of FIG. 4a, two charge transfer signals, denoted by CTS 4 and CTS 5, occur in the field periods TV2 and TV3, which occurs at approximately a period of time of ⅔ TV and ⅓ TV, respectively, before the end thereof. The column Py (TV1) of FIG. 4b corresponds to that of FIG. 2. The column Py (TV2) of FIG. 4b shows that the center point of the hatched area is lowered ⅓-part of the pick-up element height, and the column Pn Py (TV3) of FIG. 4b shows a still further lowered center point compared to the column Py (TV2). This will result in the generation of a picture signal PPS by the frame transfer device (PP, PM, SR) which perfectly agrees to a 3:1 interlace on recording and display.

As is shown in the signal diagram PS of FIG. 5a, a charge transfer signal denoted by CTS 6 and occurring, for example, approximately 5/6 TV earlier than the end of the period, can be used in the field period TV1. Then, in the field periods TV2 and TV3 two field transfer signals CTS 7 and CTS 8 must occur, more specifically approximately 3/6 TV and 1/6 TV earlier than the end of the field period TV. Compared to the column Py (TV2) of FIG. 5b, the columns Py (TV1) and Py (TV3) show that the centre point of the hatched areas are raised and lowered, respectively 2/6=⅓-part of the pick-up element height. This will result in an optimum 3:1 interlaced picture signal PPS being generated by the frame transfer device (PP, PM, SR) shown in FIG. 1.

The example for the m-method, shown in FIG. 5a and FIG. 5b has the advantageous feature of the symmetrical signal combination over the two pick-up element heights, as it holds for the field periods that: TV1 has 5/6-part own information and 1/6-part applied information, TV2 has the combination 3/6-parts and 3/6-parts and TV3 has the combination 1/6 and 5/6 parts.

When a multiple 4:1 interlaced picture signal PPS must be generated, it holds for the case in which n=4, that in three field periods TV of the picture period TP=4TV a charge transfer signal must be present, which signals must occur at approximately 3/4, 2/4 and 1/4-part of a field period TV, however in a random sequence. Formulated in its generality, it holds that when an interlace is used in which a picture period comprises an integral number of n field periods and in the event in which the charge transfer signals for the single charge transfer occur (n−1) times in the picture period, these signals must occur alternately in field period portions deviating from zero and being approximately equal to the (n−1)/n, (n−2)/n etc.-part of the field period.

When an m:1 interlaced picture signal PPS is generated with the aid of a charge transfer signal CTS in each field period TV of the picture period TP (FIG. 3a and FIG. 5a), the choice of the instant in one of the field periods TV fixes the choice of the instant in the other field period, however in an arbitrary sequence. For m=2 it holds that the instants must differ from each other for a duration of approximately ½ TV (FIG. 3a), for m=3 there must be a duration of approximately ⅓ TV (FIG. 5a). Formulated in its generality, it holds that when an interlace is used in which a picture period comprises an integral number of m field periods and for the event in which the charge transfer signals for the single charge transfer occur m-times in the picture period, these signals must alternately occur at instants of the field period which, if considered in succession, differ from each other by approximately 1/m-part of the field period. It holds also here that the sequence is a random sequence.

The charge transfer signals CTS for the single charge transfer, occurring during field scann periods TVS at predetermined instants in respective portions of the field periods TV may result at the pick-up device PP in a simultaneous or sequential charge transfer. For the simultaneous single charge transfer in the columns P1 ... Py there is the advantage that a simple parallel control of the columns P1 ... Py can be effected. The sequential single charge transfer corresponds as it were to a ripple along the columns P1 ... Py from the pick-up elements P11 ... Py1 towards the pick-up elements P1x ... Pyx of the pick-up arrangement PP of FIG. 1, or vice versa. For the sequential single charge transfer it is considered an advantage that it can be used for correcting to some extent position-dependent sensitivity differences between the pick-up elements P of the pick-up device PP, by effecting an adaptive shift of the center points of the light integration areas. These differences in sensitivity may result from asymmetries in the structure of the pick-up elements P, both as regards differences in the shape, surface area and depth of the elements. A position-dependent correction can be effected by a position-dependent variable speed at the sequential charge transfer. The variation in speed is a variation between the pick-up element columns P1 ... Py.

The sequential single charge transfer between the pick-up elements P of the columns P1 ... Py of the pick-up device PP shown in FIG. 1, which is used to obtain a desired position of the center point of specific light integration areas, may be effected in line scanning periods THS of line periods TH, in the field scanning period TVS when no cross-talk to the shift register SR is liable. Should cross-talk to the shift register occur, then the single charge transfers can be effected in the field scanning period TVS with a distribution in time over several line blanking periods THB.

Figure 6A:
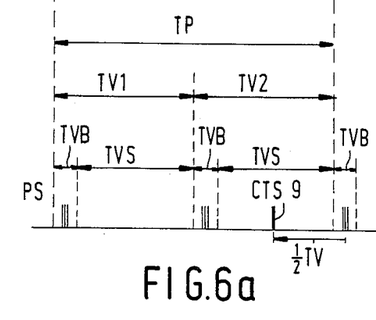
Figure 6B:
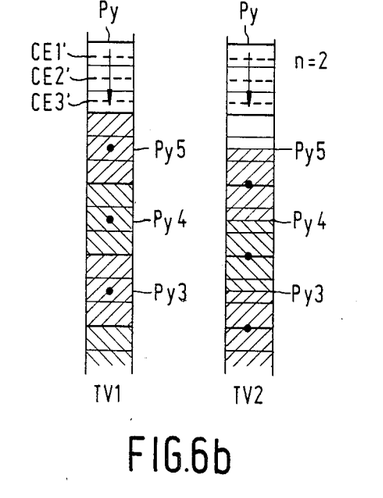

FIGS. 6a and 6b and FIGS. 7a and 7b relate to a camera structure with 2:1 interlace and three-phase controlled control electrodes. At the columns Py of FIG. 6b and FIG. 7b some control electrodes are shown by means of broken lines, which at the column Py (TV1) of FIG. 6b are denoted by CE1′, CE2′ and CE3′. The pick-up elements P are shown as consisting of three parts. In the signal diagram PS of FIG. 6a, which holds for the event in which n=2, it is shown that in the field period TV2 a charge transfer signal CTS 9 occurs approximately halfway the period ($\frac{1}{2}$ TV). Comparing the columns Py (TV1) and Py (TV2) of FIG. 6b shows, as described extensively with reference to FIG. 2, that the center point of the hatched light integration areas at the column Py (TV2) are located halfway between the areas of the column Py (TV1). This will result in a properly interlaced picture signal PPS on recording and on display.

Figure 7A:
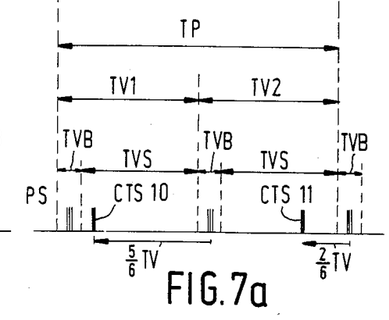
FIG. 7a and 7b show diagrams which are likewise associated with a different embodiment of a camera.
Figure 7B:
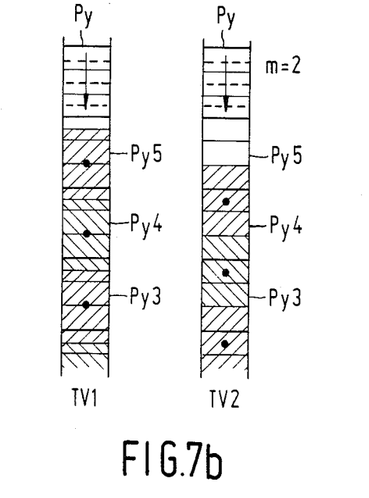

In the signal diagram PS of FIG. 7a, which holds for the event in which m=2, it is shown that in the field period TV1 at approximately 5/6-part before the end thereof a charge transfer signal CTS 10 occurs, it being a condition that a charge transfer signal CTS 11 must occur in the field period TV2 at approximately 2/6-part before the end. Comparing the columns Py (TV1) and Py (TV2) of FIG. 7b shows, as described extensively with reference to FIG. 3b, that the center points of the hatched light integration areas at the column Py (TV2) are located halfway between the areas of the column Py (TV1). It is apparent, that independent of the three-phase control for the pick-up elements P a properly interlaced picture signal PPS can be generated, which also holds for controls with higher phases.

FIG. 7a shows by way of example that the charge transfer signals CTS 10 and CTS 11 in the control signal PS occur at an instant located approximately 5/6 TV and 2/6 TV, respectively before the the end of the field periods TV1 and TV2, respectively. In this situation, during the field period TV1, an information combination is formed for the pick-up elements P having 5/6-parts its own information and 1/6-part transferred information, while for the field period TV2 it holds: 2/6-part its own information and 4/6-part transferred information. Then, in the column Py (TV1) of FIG. 7b the center point of the hatched light integration areas are located at $\frac{1}{3}$-part of the pick-up element height and those of the column Py (TV2) at 5/6-part thereof. If this information combination, or any other asymmetrical information combination, provides no advantage compared to the three-phase structure of the pick-up elements P, the symmetrical information combination (as described with reference to FIG. 3a and FIG. 3b) may be chosen, which has the information combinations of $\frac{3}{4}$-parts, $\frac{1}{4}$-part and $\frac{1}{4}$-part, $\frac{3}{4}$-parts.

In FIG. 6b and FIG. 7b the columns Py are shown with identical pick-up elements P in the field periods TV1 and TV2. It is however possible, starting from an unmodified pick-up element structure at the column Py (TV1) to shift the pick-up elements P at a column Py (TV2) over one-third or two-third parts, which can be effected in a simple way by a modification of the three-phase control. By way of example, the formation of the shifted pick-up elements P at a column Py (TV2) of two of the one-third parts of the original pick-up element (for example the two lower one-third parts of the element Py4 of the column Py (TV1)) and from one of the one-third parts of the superjacent or subjacent original pick-up element (in the example the upper one-third portion of the subjacent element Py3 of the Column Py (TV1)) is mentioned as an example. Then, the center points of the pick-up elements P in the column Py (TV2) are shifted one-third part of the pick-up element height relative to those in the column Py (TV1). The instant of occurence of the charge transfer signal CTS for the single charge transfer must be chosen such that it is adapted to this situation. A still further shift of the center point over one-sixth part of the pick-up element height produces, in combination with the said one-third part, the center point shift over half the pick-up element height, holding for the correct 2:1 interlace.

What is claimed is:

1. In a television camera creating a picture having picture periods each comprising at least a first and second field period, each of said field periods having a scan and a blanking period, said television camera having a solid-state pick-up device having pick-up elements arranged to form a plurality of columns, a control element coupled to each of said pick-up elements for transferring charge from said pick-up element to another of said pick-up elements under the control of a control signal applied thereto, the improvement comprising:
   control circuit means coupled to said control elements for generating a charge transfer signal during at least one of said field scan periods in each of said picture periods;
   and wherein each of said control elements transfers charge from the pick-up element coupled thereto the next subsequent pick-up element in the same one of said columns in response to said charge transfer signal.

2. A television camera as claimed in claim 1, wherein each of said picture periods comprises an integral number n field periods; and
   wherein said control circuit generates (n−1) charge transfer signals within said picture period at a time equal to the (n−1)/n, (n−2)/n, etc. part of each of said field periods.

3. A television camera as claimed in claim 1, wherein each of said picture periods comprises an integral number m field periods, and
   wherein said control circuit generates said charge transfer signal m times in each of said picture periods, at a first and second time instant in alternate ones of said field periods, respectively, said first and second time instants being separated from each other by approximately a 1/m part of said field period.

4. A television camera as claimed in claim 1, wherein said charge transfer takes place simultaneously in all of said columns.

5. A television camera as claimed in claim 1, wherein said charge transfer in any one of said columns takes place at a predetermined time interval relative the charge transfer in another of said columns.

6. A television camera as claimed in claim 4, wherein said pick-up elements have different sensitivities; and
   wherein said predetermined time intervals vary in accordance with said sensitivity of said pick-up elements.

7. A television camera as claimed in claim 1, wherein each of said field periods comprises a plurality of line scan periods and line blanking periods; and
   wherein said control circuit generates said charge transfer signals during a selected one of said line scan periods in said at least one field scanning period.

8. A television camera as claimed in claim 1, wherein said control circuit generates said charge transfer signal during selected ones of said line blanking periods within said at least one field scan period.

* * * * *

UNITED STATES PATENT AND TRADEMARK OFFICE
CERTIFICATE OF CORRECTION

PATENT NO. : 4,571,625

DATED : February 18, 1986

INVENTOR(S) : Arnoldus J.J. Boudewijns

It is certified that error appears in the above-identified patent and that said Letters Patent is hereby corrected as shown below:

Column 10, line 25, claim 1, after "thereto" insert --to--.

Signed and Sealed this

Sixth Day of February, 1990

*Attest:*

JEFFREY M. SAMUELS

*Attesting Officer*　　*Acting Commissioner of Patents and Trademarks*